United States Patent [19]
Gladych

[11] 3,778,926
[45] Dec. 18, 1973

[54] SLOW-FLYING AIRCRAFT

[75] Inventor: B. Michael Gladych, Issaquah, Wash.

[73] Assignee: Gentle Toy Co., Inc., Bellevue, Wash.

[22] Filed: Aug. 11, 1972

[21] Appl. No.: 280,060

[52] U.S. Cl. .................................. 46/79, 244/35 R
[51] Int. Cl. ............................................ A63h 27/00
[58] Field of Search ...................... 46/79; 244/35 R, 244/44, 47, 123

[56] References Cited
UNITED STATES PATENTS

| 2,724,211 | 11/1955 | Bloom .................................... 46/79 |
| 1,792,779 | 2/1931 | Tarr ....................................... 46/79 |
| 3,730,458 | 5/1973 | Haberkorn ........................... 244/47 |
| 3,438,597 | 4/1969 | Kasper .............................. 244/35 R |

FOREIGN PATENTS OR APPLICATIONS

| 643,205 | 9/1950 | Great Britain .......................... 46/79 |
| 563,467 | 8/1944 | Great Britain ..................... 244/45.7 |

Primary Examiner—Louis G. Mancene
Assistant Examiner—J. Q. Lever
Attorney—Ford E. Smith

[57] ABSTRACT

A slow-flying aircraft is disclosed in which there is a Canard or forewing standing out from the fuselage in advance of a transversely disposed rear-swept main wing having upward and outward and rear-swept stabilizer fins at its tips. The aircraft is formed of lightweight foamlike material. Means is provided to vary the decalage of the wing surfaces to permit increase or decrease of lift provided by the wings and also to increase or decrease drag. Preferably the wing elements are shiftably mounted in curved camber slots through the fuselage to provide variable flight performance of the aircraft. This abstract is neither intended to define the invention of this application which, of course, is measured by the claims; nor is it intended to be limiting as to the scope of the invention in any way.

10 Claims, 4 Drawing Figures

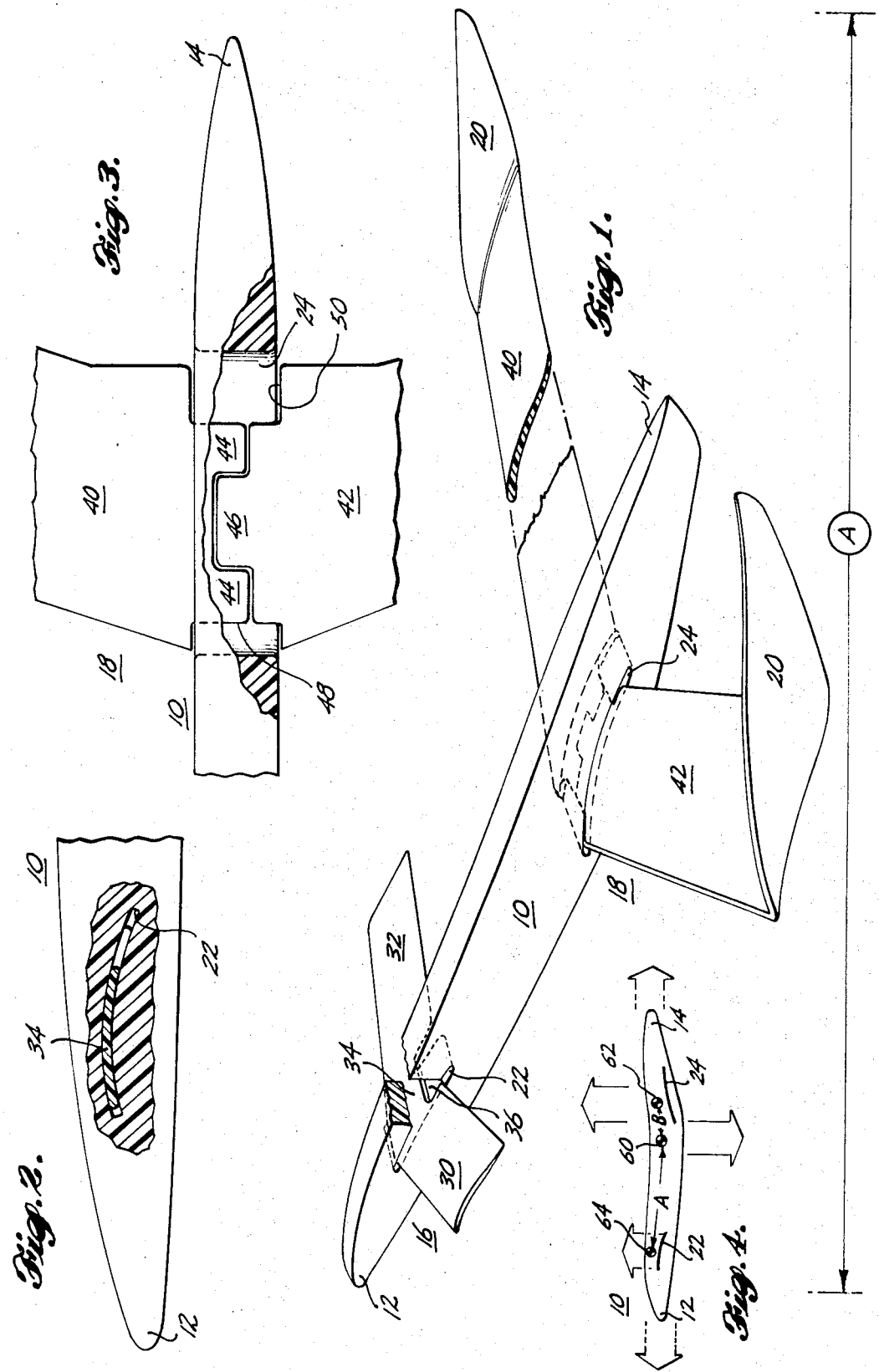

SLOW-FLYING AIRCRAFT

BACKGROUND OF THE INVENTION

1. Field of the Invention

This invention is concerned with slow-flying aircraft of the type known as short take-off and landing and by abbreviation STOL.

2. Known aircraft Configurations

It is known to the art to employ in a forward position in an airframe, ahead of the main wing, a Canard or forewing to provide horizontal stability to the craft in flight. It is believed unknown in such a configuration to provide means whereby the angle of incidence or attach of one or both of said wings can be changed relative the fuselage and/or relative each other to vary the lift and hence the drag in either an increasing or decreasing order.

SUMMARY OF THE INVENTION

A principal object of the invention is the provision of an aircraft configuration involving a fuselage having a rearward swept main wing and a Canard or forewing in forward spaced-apart relation, both extending transversely from the fuselage and, at the tips of the main wing upward and outward canted stabilizer elements which sweep rearward relative the span-wise axes of said main wing to, in effect, provide slender delta wing sections which function beneficially during flight to reduce or delay whip stall tendencies in the aircraft.

Among the principal objects of this invention have been the provision of an aircraft which is slow-flying stable about all axes down to zero forward speed and functions as a STOL type; which is simple of construction and easy to operate; which lends itself to a multitude of adjustments of the operational components to provide a multitude of operational characteristics; and which is equally airworthy when produced as a real aircraft or as a toy.

In relation to the incorporation of the invention in a toy aircraft, a main object has been to provide a structure so designed and constructed that the components may be easily formed and molded from suitable plastic foam material so as to be extremely light in weight, durable, economical and easily assembled and used by relatively unskilled persons such as children.

Other objects and advantages will become apparent during the course of the following description of the invention as applied to a preferred form of toy aircraft.

BRIEF DESCRIPTION OF THE DRAWINGS:

FIG. 1 is a perspective view of a slow-flying aircraft according to this invention, portions having been broken away for illustrative purposes;

FIG. 2 is a side view partially in section of the fuselage nose;

FIG. 3 is a plan view with portions omitted of the fuselage tail and a portion of the main wing; and FIG. 4 is a schematic view of the fuselage.

DETAILED DESCRIPTION OF THE INVENTION

The essential elements of this aircraft are the fuselage 10 having nose 12 and a trailing or tail portion 14. In a forward position of the fuselage is the Canard or forewing 16 and, rearward thereof, the main wing 18. Both wings extend symmetrically of the fuselage in opposite transverse directions. Both wings are rearwardly swept each forming an obtuse angle relative the longitudinal axis of the fuselage. The tips of the main wing sections support directional stabilizer fins 20 which extend upward and outward in a relatively flat obtusely angular relationship to the longitudinal axis of the main wing element. Fins 20 also rake rearward behind the trailing edge of main wing 18.

Fuselage 10 and wing elements 16 and 18 are preferably formed by well-known molding and forming techniques from polystyrene foam material which produces a toy aircraft that is extremely light in weight and very strong and rugged in use.

Referring to FIG. 2, where portions have been broken away and shown in section, it will be seen that forwardly there is a curved chamber slot 22 extending transversely from side to side through the fuselage 10. A similar curved camber slot 24 also extending transversely through the fuselage 10 is provided rearwardly in the fuselage 10 for the reception and mounting and adjustable disposition of main wing 18.

The Canard or forewing 16 comprises two rearwardly swept, cambered wing elements 30 and 32 medially spaced apart and connected by a bridge portion 34 slightly longer than the transverse thickness of fuselage 10. In the assembled toy aircraft, bridge portion 34 is disposed in the forward slot 22, one or the other of elements 30, 32 having been first threaded therethrough. The fore-and-aft or chord dimension of bridge 34 is somewhat less than the length of slot 22. Notch 36 at the rear of wing 16 permits that wing to be disposed in part to the rear end of slot 22. The bridge element 34 is slidably movable in curved slot 22 permitting adjustment of the angle of attack of forewing 16 and adjustment of its physical relationship and effect relative the center of gravity (CG) of the aircraft. With bridge 34 in the extreme rearward position in slot 22, forewing 16 assumes its highest angle of incidence which produces its highest lift. The result is slow speed and short flight caused by the high drag due to the larger area of forewing surface presented to the air. The drag of the Canard or forewing 16 is reduced by shifting bridge element 34 forward in slot 22. This reduces the angle of incidence and, consequently, because drag has been reduced, flight speed and distance will be increased.

As shown in FIG. 3 the main wing 18 comprises two curved, rear-swept, wing segments or foils 40 and 42. Each has tongue elements on its inner or root end disposed in slot 24 when asssembled. The wing member 40 has two tongue elements 44, 44 spaced apart from each other on the fuselage axis as shown in FIG. 3. Wing element 42 has a single central tongue element 46 which is interfitted between the tongues 44, 44 of the opposite wing 40.

In assembling the main wing 18, one element is carefully inserted into and partially through slot 24 sufficient to expose its tongue or tongues, whichever element is used. The interfitting tongue means of the other main wing element are then aligned and the joint is secured by wrapping the parts with a strip of pressure-sensitive adhesive tape. When the main wing joint or bridge is worked back into slot 24 and the wing properly aligned, the aircraft is ready for flight.

The thickness of the forewing bridge 34 and of the joined tongue elements 44 and 46 is such that when they are inserted in their respective slots in the fuselage they are compressed slightly and a firm frictional engagement results. This grips and holds the wings in place as trimmed for flight but, nevertheless, permits the wing elements to be harmlessly skewed or twisted or cocked out of line should the aircraft strike an object or the ground during flight.

Note that main wing 18 is notched forwardly at 48 and rearwardly at 50 so that the bridge between the two wing elements 40, 42, comprising the interfitted tongues 44, 46, has an effective fore-and-aft or chordal dimension that is materially less than the length of slot 24. By this arrangement, main wing 18 may be shifted forwardly or rearwardly relative the Canard or forewing 16 and also relative the center of gravity of the assembly.

When main wing 18 is disposed in the extreme rear of slot 24 it has the least angle of incidence and the least lift. When wing 18 is placed in the most forward position of slot 24 the angle of attack is the greatest, the lift the highest and, of course, the drag produced by wing 18 is the greatest.

The center of gravity (CG) of the aircraft is always within the fuselage 10 between wings 16 and 18 and always closer to wing 18 than to forewing 16, in the region just ahead of the front end of slot 24.

Referring to FIG. 4 the center of gravity of the assembly (indicated by the symbol CG), is at a location slightly in advance of the center of lift of the main wing 18 (designated CLM), and substantially to the rear of the center of lift of the forewing 16 (designated CLF). The distance between the CG and CLW of the forewing is designated as an arm A in FIG. 4. The distance between the CG and the CLM of the main wing is designated as arm B. It will be noted that arm A is considerably longer than arm B, thus providing greater relative leverage for the forewing 16 as with respect to the main wing 18. Naturally, the CG moves in the structure as one changes the trim of either the forewing 16 or the main wing 18. In general, with the forewing 16 at the rear limits of slot 22 and the main wing 18 at the rear limits of slot 24 the CG will be at its most rearward location relative the aircraft. Various forward positions of either or both the forewing and the main wing will change the operating characteristics of this aircraft in flight, each slight move producing incremental but observable changes in performance. The aerodynamic principles of this aircraft can be summed up in the following formula: when both wings, Canard and main, are closest to each other in their respective slots and arms A and B are their shortest, there is a high lift factor in the aircraft accompanied by a high drag factor; and when both wings are farthest apart, having been shifted away from each other in their respective slots, the operation of the aircraft is evidenced by low lift and low drag.

The forewing 16 funtions as a horizontal stabilizer for the aircraft and, being located ahead of the main wing contributes to total lift rather than detracting from main wing lift as is the case with conventional aircraft where horizontal stabilizing surfaces are located after the main wing. The lifting force added by forewing 16 contributes materially to the slow flying characteristics of this aircraft.

The outward and rearward canted stabilizer fins 20, 20 located at and above the tips of main wing 18 not only supply or provide directional stabilization but, due to their configuration and disposition, also contribute to the overall lift of the aircraft. In flight at very high angles of attach such as for example during steep descending paths of flight the wing-tip fins 20,20 spontaneously generate stabilizing vortices and produce a strong stabilizing effect longitudinally of the aircraft. Fins 20, 20, in effect, provide a slender delta wing section at each wing tip. At high angles of attack during flight the spontaneously produced vortex above each stabilizer element 20 reduces, if not avoids, the too rapid inboard shift of the center of pressure (CP) of the main wing sections. This delays and reduces whip stall tendencies and prolongs flight, therefore materially contributing to the craft's slow flying characteristics. The wing-tip stabilizer fins 20,20 also cooperate with the Canard 16 in maintaining the craft on even keel during flight all the way down to a vertical landing.

Slowest flight of the aircraft results when the assembly is trimmed with the forewing 16 at its rearmost position in slot 22 and main wing 18 at its foremost position in slot 24. The wing elements must extend symmetrically and equally from opposite sides of the fuselage. The aircraft should be launched levelly into flight from the elevated position with gentle and smooth forward motion. The craft will then descend almost vertically or at the most with but slight forward speed having moved forward at the most but a few feet. When so launched, if the aircraft climbed excessive launching force was applied. It will be understood that such a short, slow and steeply descending flight is caused by the very high drag and high lift resulting from wings 16 and 18 having been trimmed to place them most closely together in the fuselage 10.

Now if the Canard 16 is shifted fully forward in slot 22, and the main wing 18 remains in its fully forward trim position, the reduction of drag from forewing 16 will be evidenced by a longer flight of the aircraft. This trim shifts the CG forward and also reduces the lift of the forewing 16. Flight will then be very slow but forward travel has increased materially. By now shifting main wing 18 to the rearmost position in slot 24 with forewing 16 fully forward, upon a level and gentle launching, the aircraft will have a very long protracted but somewhat faster flight.

Turns, spirals, loops, Immelman turns, and rolls during flight are produced by variously trimming the aircraft and by launching at different speeds, or while banked at the moment of launch.

The wings being formed of thin polystyrene foam shaped and molded as shown are subject to fine trimming and adjustments manually. The cross-sectional shapes of the foils may be changed by gently stroking and squeezing and shaping them between the thumb and fingers. When they are warmed slightly, preferably by the heat of friction from rubbing, the camber may be slightly changed. The aspects of the stabilizing fins 20 relative their associated wing elements may be changed by manual bending and working. The polystyrene foam material is also easily sanded to smooth surfaces, to change contours, and to thin or refine the wing element edges. Nicks occurring during flying accidents should also be smoothed or removed by sanding to lessen their effect on the aerodynamics of the aircraft.

While the plastic foam material is here described as a closed-cell polystyrene foam, it will be obvious to those skilled in the pertinent art that other plastic foams such as those of polyurethane and polyethylene nature may be substituted. The principal criteria are the characteristics of extreme lightness, toughness, moldability, retention of shape, low cost and the like.

It will be apparent that this aircraft may be proportioned somewhat differently than as shown. For example the wing spans may be increased or decreased relative the fuselage dimensions or relative each other with, naturally, some changes in performance characteristics. A preferred aircraft according to this invention has been developed and flown in which the following were the principal dimensions:

| | |
|---|---|
| Fuselage length | 15 ⅛" |
| Fuselage depth at main wing | 1 ½" |
| Main wing span | 26 " |
| Canard span | 10" |
| Dihedral main wing | ca. 4° |
| Angle of fins to main wing elements | ca. 45° |
| Main wing sweep angle | ca. 20° |
| Weight of assembly | ½ oz. |

The foregoing description and preferred example are to be understood only to be illustrative of this invention, and it is intended that the invention be not limited thereto. All substitution, alterations and modifications of the present structure which come within the scope of the following claims or to which the present invention is readily susceptible, without departing from the spirit and scope of this disclosure, are to be considered part of the present invention.

What is claimed is:

1. An aircraft, comprising:
-- a fuselage;
-- a pair of opposed, rearward swept, main wings mounted to extend transversely from said fuselage;
-- a pair of opposed forewings mounted to extend transversely from said fuselage in forward spaced-apart relation to said main wing surfaces; and
-- at the other tip of each main wing, an upward and outward canted stabilizer element rearwardly swept relative the span-wise axis of said main wing.

2. The structure of claim 1 in which there is:
-- means shiftably mounting at least one pair of said wings in said fuselage for movement of the center of pressure of said one pair of wings relative the center of gravity of the aircraft.

3. The structure of claim 2 in which said means shiftably mounted said one pair of wings includes means to vary the angle of incidence of said wings.

4. The structure according to claim 2 in which both pairs of said wings are shiftably mounted for movement of their respective centers of pressure relative the center of gravity of said fuselage and relative to each other.

5. The structure according to claim 4 in which the means shiftably mounting said pairs of wings includes means to vary the angles of incidence of both pairs of wings.

6. The structure according to claim 4 in which the means shiftably mounting said pairs of wings each comprise a slot transverse the longitudinal axis of the fuselage, and each slot receives and holds a root portion of said wings to maintain the same in their transverse relationships to said fuselage.

7. The structure according to claim 6 in which said slots are each longer than the root portions of the respective wings received therein.

8. The structure according to claim 7 in which said slots are camber curved and selected positions of the root portions therein provide selected angles of incidence of the respective wings.

9. The structure according to claim 7 in which the main wings are separate elements and at their roots there are interfitting means and the same are disposed in the respective slot within said fuselage.

10. The structure according to claim 1 in which the fuselage and the main and forewings are formed of closed-cell, plastic foam material.

* * * * *